(12) United States Patent
Burgman et al.

(10) Patent No.: US 7,913,580 B2
(45) Date of Patent: Mar. 29, 2011

(54) APPARATUS AND METHOD FOR SECURING TRANSMISSION GEAR SYNCHRONIZERS TO SHAFTS

(75) Inventors: Boris I. Burgman, Oak Park, MI (US); John A. Diemer, Farmington Hills, MI (US); Henryk Sowul, Oxford, MI (US); David B Mischler, Marblehead, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 715 days.

(21) Appl. No.: 12/013,034

(22) Filed: Jan. 11, 2008

(65) Prior Publication Data

US 2008/0184831 A1  Aug. 7, 2008

Related U.S. Application Data

(60) Provisional application No. 60/898,850, filed on Feb. 1, 2007.

(51) Int. Cl.
*F16H 57/00* (2006.01)
(52) U.S. Cl. .......................................................... 74/330
(58) Field of Classification Search ..................... 74/330
See application file for complete search history.

(56) References Cited

U.S. PATENT DOCUMENTS

| | | | | |
|---|---|---|---|---|
| 2,394,580 A | * | 2/1946 | Banker | 477/79 |
| 2,519,122 A | * | 8/1950 | Dence | 184/11.1 |
| 2,542,911 A | * | 2/1951 | Eaton | 74/375 |
| 3,253,475 A | * | 5/1966 | Papst | 74/364 |
| 3,885,446 A | * | 5/1975 | Pengilly | 74/331 |
| 4,138,006 A | * | 2/1979 | Benson, Jr. | 192/48.91 |
| 2005/0160848 A1 | * | 7/2005 | Thiessen et al. | 74/325 |

FOREIGN PATENT DOCUMENTS

GB    1172547 A    12/1969

\* cited by examiner

*Primary Examiner* — Sherry Estremsky

(57) ABSTRACT

A device and method for preloading a transmission shaft assembly is disclosed. The transmission having the device of the present invention generally has a plurality of gears for providing a plurality of speed ratios. The shaft assembly has a first shaft, a first sleeve shaft, a second sleeve shaft and a first fastener. The first shaft has a flange end and an adjustment end. The first sleeve shaft is concentric with the first shaft and has a first end. The first end of the first sleeve shaft is in communication with the flange end of the first shaft. The second sleeve shaft is concentric with the first shaft and is axially aligned with the first sleeve shaft. The second sleeve shaft has a first end. The plurality of synchronizers for selectively connecting at least one of the plurality of gears to at least one of the first and second sleeve shafts. The first fastener is engagable with the adjustment end of the first shaft and is configured to move axially on the adjustment end. The first fastener has a fastener flange that contacts the first end of the second sleeve shaft. The engagement of the first fastener with the adjustment end generates a compressive force through the flange end of the first shaft to the first end of the first sleeve shaft and through the fastener flange to the first end of the second sleeve thereby forcing the first sleeve shaft to move closer to the second sleeve shaft.

18 Claims, 1 Drawing Sheet

APPARATUS AND METHOD FOR SECURING TRANSMISSION GEAR SYNCHRONIZERS TO SHAFTS

CROSS-REFERENCE TO RELATED APPLICATION

The present application claims priority to U.S. Provisional Patent Application Ser. No. 60/898,850 filed on Feb. 1, 2007 and hereby incorporated by reference.

TECHNICAL FIELD

The present invention relates to a system and method for preventing axial movement of a synchronizer and other elements along a shaft.

BACKGROUND

Vehicle transmissions conventionally have a plurality of synchronizers. The synchronizers transfer the torque from various shafts to the gears and from gears to shafts through splines. It is important to connect the synchronizers to the shafts in such a way to prevent axial movement of the hub of the synchronizer relative to the shaft. One common method for attaching the hub of the synchronizer to the shaft is to press fit the hub on to the shaft. Unfortunately, the press fit varies due to manufacturing tolerances. Thus, gear loading through the hub of the synchronizer to the ground or structural members (i.e. transmission case walls, center supports, etc.) can unseat the synchronizer hubs and cause them to move axially. Eventually, axial movement of the synchronizer hubs will increase the clearance between the shaft and the hub splines, which will lead to high operating noise, and may cause shaft and/or Hub failure.

Known prior art solutions use additional features (i.e. additional snap rings or bearings pushed on shafts with a heavy press fit) to secure the synchronizer hubs to the shafts. While these methods may improve the connection of the hubs to the shafts these prior art methods do not eliminate axial movement of the synchronizer hubs. For example, the clearance between the snap ring and bearing race or gear hub, which allows the synchronizer hub to move axially and eventually may cause the synchronizer hub failure.

While shaft bearings (i.e. tapered bearings) reduce axial movement of the synchronizer hubs in the early operating life of the transmission, axial clearance which causes axial movement of the synchronizer hub is not eliminated. Moreover, over time the bearing races move axially due to a creeping process and, consequently, allow the synchronizer hub to move axially and in turn may lead to synchronizer hub failure.

Accordingly, a new and improved apparatus and method for retaining the synchronizers and other components on a transmission shaft is needed.

SUMMARY

In an aspect of the present invention a transmission having a plurality of gears mounted to an adjustable shaft assembly for providing a plurality of speed ratios is provided. The transmission includes a shaft assembly having a first shaft, a first sleeve shaft, a second sleeve shaft, and a first fastener and a plurality of synchronizers. The first shaft has a flange end and an adjustment end. The first sleeve shaft is concentric with the first shaft and has a first end. The first end of the first sleeve shaft is in communication with the flange end of the first shaft. The second sleeve shaft is concentric with the first shaft and is axially aligned with the first sleeve shaft. The second sleeve shaft has a first end. The plurality of synchronizers for selectively connecting at least one of the plurality of gears to at least one of the first and second sleeve shafts. The first fastener is engagable with the adjustment end of the first shaft and is configured to move axially on the adjustment end. The first fastener has a fastener flange that contacts the first end of the second sleeve shaft. The engagement of the first fastener with the adjustment end generates a compressive force through the flange end of the first shaft to the first end of the first sleeve shaft and through the fastener flange to the first end of the second sleeve thereby forcing the first sleeve shaft to move closer to the second sleeve shaft.

In accordance with another aspect of the present invention, the adjustment end is a threaded end portion of the first shaft.

In accordance with yet another aspect of the present invention, the first fastener is an internally threaded nut that is turned onto the threaded end portion of the first shaft.

In accordance with yet another aspect of the present invention, the transmission further comprises a second shaft having a flange end and an adjustment end.

In accordance with yet another aspect of the present invention, the transmission further comprises a third sleeve shaft concentric with the second shaft having a first end, wherein the first end of the third sleeve shaft is in communication with the flange end of the second shaft and a fourth sleeve shaft concentric with the second shaft and axially aligned with the third sleeve shaft, wherein the fourth sleeve shaft has a first end.

In accordance with yet another aspect of the present invention, the transmission further comprises a second fastener engagable with the adjustment end of the second shaft and configured to move axially on the adjustment end, wherein the second fastener has a fastener flange that contacts the first end of the second sleeve and whereby the engagement of the second fastener with the adjustment end generates a compressive force through the flange end of the second shaft to the first end of the third sleeve shaft and through the fastener flange to the first end of the fourth sleeve thereby forcing the third sleeve shaft to move closer to the fourth sleeve shaft.

In accordance with still another aspect of the present invention, the first sleeve shaft further comprises a step in the first sleeve shaft that contacts at least one of the plurality of synchronizers.

In accordance with still another aspect of the present invention, a spacer concentric with the first shaft and the first sleeve shaft and disposed between a transmission housing structure and at least one of the plurality of synchronizers.

In accordance with yet another aspect of the present invention, a method for preloading a transmission shaft assembly having a first shaft, a first sleeve shaft and a second sleeve shaft is provided. The method includes providing the first shaft with a flange end and an adjustment end. Additionally, the first sleeve shaft is provided concentric with the first shaft and having a first end, wherein the first end of the first sleeve shaft is in communication with the flange end of the first shaft. Further, the second sleeve shaft is provided concentric with the first shaft and axially aligned with the first sleeve shaft, wherein the second sleeve shaft has a first end. Moreover, a first fastener is engagable with the adjustment end of the first shaft and is configured to move axially on the adjustment end, wherein the first fastener has a fastener flange that contacts the first end of the second sleeve shaft. Finally, the first fastener is engaged with the adjustment end to generate a compressive force through the flange end of the first shaft to the first end of the first sleeve shaft and through the fastener flange to the first end of the second sleeve thereby forcing the first sleeve shaft to move closer to the second sleeve shaft.

DESCRIPTION

Figure 1:
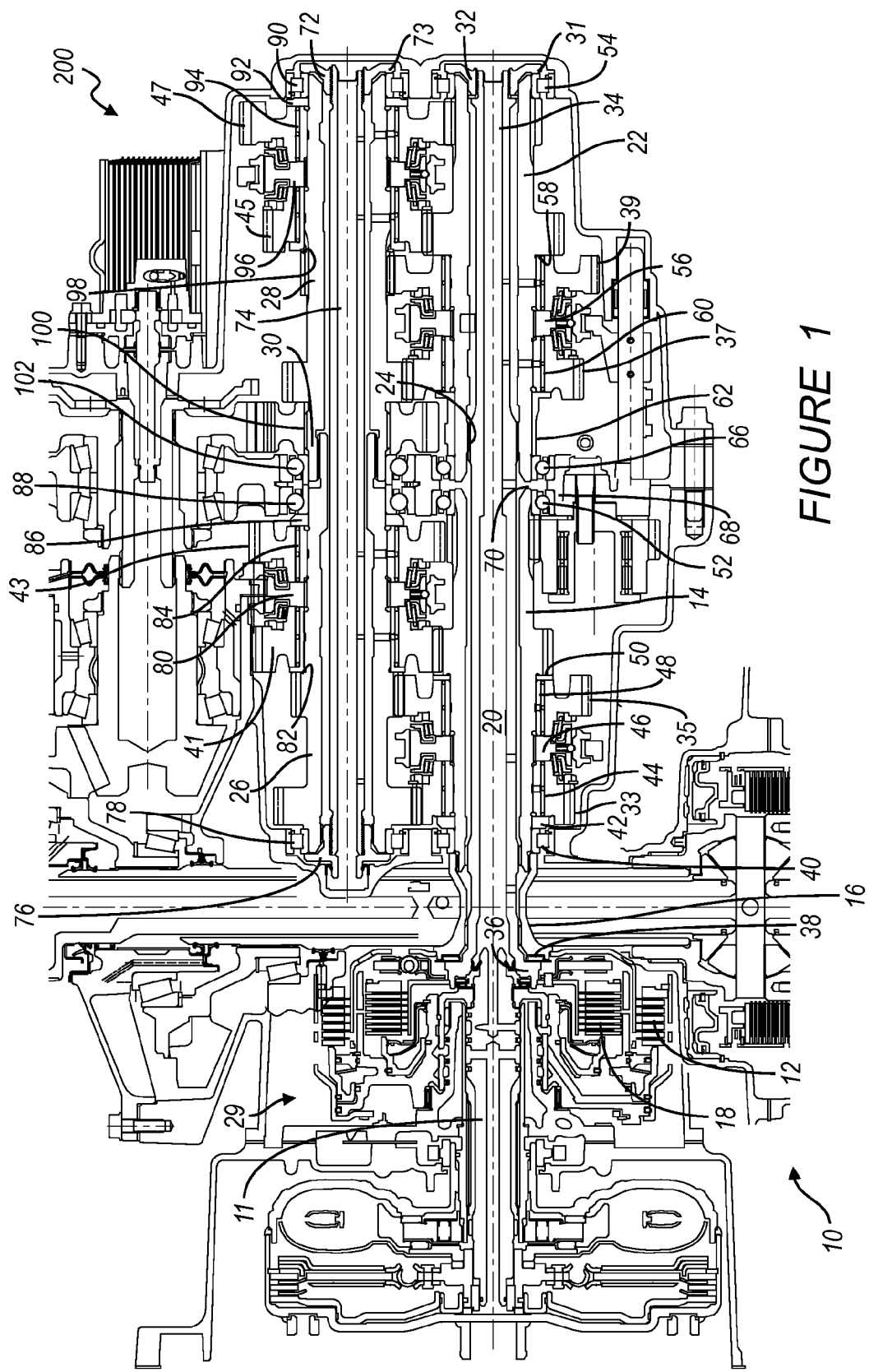
FIG. 1 is a partial cross-sectional view of an embodiment of a transmission having an apparatus for retaining the synchronizers and other components on the transmission shaft to prevent axial movement of the synchronizers and other components along the shaft, in accordance with the present invention.

Referring to FIG. 1, a partial cross-sectional view of a transmission 10 is illustrated. The transmission 10 includes an input member 11 and output member (not shown). In the present embodiment, the input member and the output member are shafts, and will be referred to as such. Those skilled in the art will appreciate that the input and output members may be components other than shafts. The input shaft is continuously connected with a torque converter or other starting device. An engine (not shown) is connected to and provides a driving torque to the torque converter (not shown). The output shaft is continuously connected with a final drive unit (not shown). The transmission 10 may include a countershaft gearing arrangement that includes intermediate shafts, countershafts, co-planar intermeshing gear sets and selectively engagable synchronizers as will be described herein.

In the present embodiment, a countershaft gearing arrangement 200 includes a first sleeve shaft 14, a first input shaft 20 and a second sleeve shaft 22. Torque is transferred from a torque converter (not shown) to input member 11 that is rotationally fixed to first input shaft 20. First input shaft 20 transfers the driving torque to second sleeve shaft 22 through splines 24. First sleeve shaft 14 is a sleeve shaft concentric with the first input shaft 20. Further, an extension shaft 21 is coupled to and axially aligned with second sleeve shaft 22. Moreover, the countershaft gearing arrangement 200 further includes a single countershaft 23 having a first countershaft portion 26 and a second countershaft portion 28, which are axially aligned and coupled to one another through splines 30. Countershaft portions 26 and 28 are both spaced from and parallel with first sleeve shaft 14, first input shaft 20 and second sleeve shaft 22. Alternatively, the present invention contemplates multiple countershafts.

A dual clutch 29 is connected between transmission input shaft (not shown) and first sleeve shaft 14, first input shaft 20 and second sleeve shaft 22. The dual clutch 29 includes a first and a second clutch elements or hubs 12 and 18. Clutch elements 12 and 18 together with clutch shaft 16 are configured to form a friction clutch, as well known in the art as a dual clutch. More specifically, clutch elements 12, 18 have friction plates mounted thereon that interact to form a friction clutch. Further, clutch element 12 is connected for common rotation through clutch shaft 16 to first sleeve shaft 14 and clutch element 18 is connected for common rotation with first input shaft 20. Thus, selective engagement of clutch element 12, connects the input shaft for common rotation with first sleeve shaft 14 and selective engagement of clutch element 18, connects the input shaft for common rotation with first input shaft 20.

The countershaft gearing arrangement 200 also includes co-planar, intermeshing gear sets. For example, gears 33, 35 are concentric with and selectively engagable with first sleeve shaft 14, gears 37, 39 are concentric and selectively engagable with second sleeve shaft 22, gears 41, 43 are concentric and selectively engagable with first countershaft portion 26, and gears 45, 47 are concentric and selectively engagable with second countershaft portion 28.

The present invention provides an apparatus and method for preloading elements (ie. bearing races, sleeves, gear hubs, synchronizer hubs and the like) mounted about first sleeve shaft 14, second sleeve shaft 22, first countershaft portion 26 and second countershaft portion 28. More specifically, an elongated member or bolt 34 is attached or integrally formed on an end portion of first input shaft 20. Member or bolt 34 has an adjustment end portion. For example, the adjustment end portion of bolt 34 includes external threads that cooperate and engage a fastener member or internally threaded nut 32 to preload elements disposed about first sleeve shaft 14 and second sleeve shaft 22.

For example, tightening or turning nut 32 creates tension or a preload force in bolt 34 and first shaft 20. The preload force is transferred from a flange 36 of the shaft 20 through thrust bearing 38 and clutch shaft 16 to the inner race of cylindrical bearing 40, then through the washer 42 and sleeve 44 to the synchronizer hub 46. Thereafter, the preload force is transferred from hub 46 through sleeve 48 and washer 50 to first sleeve shaft 14. From first sleeve shaft 14 the preload force is transfer to the inner race of angular ball bearing 52 and through the bearing balls to the outer race of ball bearing 52 to a structural transmission housing member or ground 68.

The same amount of preload force generated by turning nut 32 onto bolt 34 acts on the inner race of cylindrical bearing 54 and is transferred to the second sleeve shaft 22. More specifically, nut 32 has a flange 31 that engages or contacts the inner race of cylindrical bearing 54, thus the preload force is transferred to the inner race through flange 31. Second sleeve shaft 22 transfers the preload force to the synchronizer hub 56 thru a shaft step or transition 58. Further, the preload force is transferred from the synchronizer hub 56 to a sleeve 60, a spacer 62 and to the inner race of angular ball bearing 66. Then finally the preload force propagates through the balls of angular bearing 66 to the outer race of bearing 66 to a structural transmission housing member or ground 68. Thus, any clearances between the elements mounted about first sleeve shaft 14, second sleeve shaft 22 (ie. bearing races, sleeves, gear hubs, synchronizer hubs and the like) are reduced or eliminated.

Advantageously, the present invention limits the preload by providing a selective washers 42, 50, which may be interchanged with washers of a desired thickness or size. The selected washers of a desired thickness are used limit the preload force. It should be noted that further turning or tightening nut 32, when the distance in the interface 70 between first shaft 20 and second sleeve shaft 22 equals zero, causes tension in bolt 34 and compression in second sleeve shaft 22.

In a similar manner, preloading elements (ie. bearing races, sleeves, gear hubs, synchronizer hubs and the like) on first countershaft portion 26 and second countershaft portion 28 is achieved through the use of fastener or nut 72 and bolt 74. More specifically, nut 72 is turned onto bolt 74 a predetermined amount to reduce or eliminate any clearances between bearing races, sleeves, gear hubs, synchronizer hubs and the first and second countershaft portions. The preload force is transferred from bolt flange 76, through inner race of cylindrical bearing 78 to the first countershaft portion 26 and then to the synchronizer hub 80 through to shaft step 82. The preload force is then transferred from the hub 80 through the sleeve 84 and washer 86 to the angular contact ball bearing 88. From the other end of the transmission, the nut 72 has a flange 73 that contacts or engages the inner race of cylindrical bearing 90. Further, the preload force is transferred through the washer 92 and sleeve 94 to the synchronizer hub 96. Moreover, the preload force acting on hub 96 is transferred to the second countershaft portion 28 through the step 98. Second countershaft portion 28 transfers the preload to gear hub 100 which in turn transfers the preload force to the angular ball bearing 102. Thus, any clearances between the elements mounted about first countershaft portion 26, second countershaft portion 28 (ie. bearing races, sleeves, gear hubs, synchronizer hubs and the like) are reduced or eliminated.

Accordingly, the use of bolts 34 and 74 and nuts 32 and 72 to create preloading eliminates clearances in shaft assemblies and creates desired conditions for synchronizer hubs. Moreover, the present invention allows for the use of transmission housing or case materials having high coefficients of thermal expansion (e.g. Magnesium) without significantly affecting the bearing design and preload setting. This is due to the fact that: 1) cylindrical roller bearings 78, 90 are mounted at the ends of each shaft 26 and 28, respectively, and cylindrical roller bearings 40, 54 are mounted at the ends of each shaft 14 and 22, respectively; 2) the angular contact ball bearings 88, 102 are mounted in close proximity to each other at the other end of shafts 26 and 28, respectively, and the angular contact ball bearings 52, 66 are mounted in close proximity to each other at the other end of shafts 14 and 22, respectively; and 3) the bearing outside diameter fit to the case is a loose fit at room temperature. This bearing arrangement provides axial space saving as compared to the use of two pairs of tapered roller bearings or combination of double row ball bearings and cylindrical roller bearings.

While the best modes for carrying out the invention have been described in detail, those familiar with the art to which this invention relates will recognize various alternative designs and embodiments for practicing the invention.

The invention claimed is:

1. A transmission comprising:
    a plurality of gears for providing a plurality of speed ratios;
    a first shaft having a flange end and an adjustment end;
    a first sleeve shaft concentric with the first shaft having a first end, wherein the first end of the first sleeve shaft is in communication with the flange end of the first shaft;
    a second sleeve shaft concentric with the first shaft and axially aligned with the first sleeve shaft, wherein the second sleeve shaft has a first end;
    a plurality of synchronizers for selectively connecting at least one of the plurality of gears to at least one of the first and second sleeve shafts;
    a first fastener engagable with the adjustment end of the first shaft and configured to move axially on the adjustment end, wherein the first fastener has a fastener flange that contacts the first end of the second sleeve shaft; and
    whereby the engagement of the first fastener with the adjustment end generates a compressive force through the flange end of the first shaft to the first end of the first sleeve shaft and through the fastener flange to the first end of the second sleeve thereby forcing the first sleeve shaft to move closer to the second sleeve shaft.

2. The transmission of claim 1 wherein the adjustment end is a threaded end portion of the first shaft.

3. The transmission of claim 2 wherein the first fastener is an internally threaded nut that is turned onto the threaded end portion of the first shaft.

4. The transmission of claim 1 further comprising a second shaft having a flange end and an adjustment end.

5. The transmission of claim 4 further comprising a third sleeve shaft concentric with the second shaft having a first end, wherein the first end of the third sleeve shaft is in communication with the flange end of the second shaft and a fourth sleeve shaft concentric with the second shaft and axially aligned with the third sleeve shaft, wherein the fourth sleeve shaft has a first end.

6. The transmission of claim 5 further comprising a second fastener engagable with the adjustment end of the second shaft and configured to move axially on the adjustment end, wherein the second fastener has a fastener flange that contacts the first end of the second sleeve and whereby the engagement of the second fastener with the adjustment end generates a compressive force through the flange end of the second shaft to the first end of the third sleeve shaft and through the fastener flange to the first end of the fourth sleeve thereby forcing the third sleeve shaft to move closer to the fourth sleeve shaft.

7. The transmission of claim 1 wherein the first sleeve shaft further comprises a step in the first sleeve shaft that contacts at least one of the plurality of synchronizers.

8. The transmission of claim 1 further comprising a spacer concentric with the first shaft and the first sleeve shaft and disposed between a transmission housing structure and at least one of the plurality of synchronizers.

9. The transmission of claim 1 further comprising a first cylindrical roller bearing mounted at the first end of the first sleeve shaft and a second cylindrical roller bearing mounted at the first end of the second sleeve shaft.

10. The transmission of claim 9 further comprising a first angular roller bearing mounted at a second end of the first sleeve shaft and a second angular roller bearing mounted at a second end of the second sleeve shaft.

11. A method for preloading a transmission shaft assembly having a first shaft, a first sleeve shaft and a second sleeve shaft, the method comprising:
    providing the first shaft with a flange end and an adjustment end;
    providing the first sleeve shaft concentric with the first shaft and having a first end, wherein the first end of the first sleeve shaft is in communication with the flange end of the first shaft;
    providing the second sleeve shaft concentric with the first shaft and axially aligned with the first sleeve shaft, wherein the second sleeve shaft has a first end;
    providing a first fastener engagable with the adjustment end of the first shaft and configured to move axially on the adjustment end, wherein the first fastener has a fastener flange that contacts the first end of the second sleeve shaft; and
    engaging the first fastener with the adjustment end to generate a compressive force through the flange end of the first shaft to the first end of the first sleeve shaft and through the fastener flange to the first end of the second sleeve thereby forcing the first sleeve shaft to move closer to the second sleeve shaft.

12. The method of claim 11 further comprising providing the adjustment end with a threaded end portion.

13. The method of claim 12 wherein providing the first fastener further comprising providing a fastener with an internally threaded nut that is turned onto the threaded end portion of the first shaft.

14. The method of claim 11 further comprising providing a second shaft having a flange end and an adjustment end.

15. The method of claim 14 further comprising providing a third sleeve shaft concentric with the second shaft having a first end, wherein the first end of the third sleeve shaft is in communication with the flange end of the second shaft and a fourth sleeve shaft concentric with the second shaft and axially aligned with the third sleeve shaft, wherein the fourth sleeve shaft has a first end.

16. The method of claim 15 further comprising providing a second fastener engagable with the adjustment end of the second shaft and configured to move axially on the adjustment end, wherein the second fastener has a fastener flange that contacts the first end of the second sleeve and whereby the engagement of the second fastener with the adjustment end generates a compressive force through the flange end of the second shaft to the first end of the third sleeve shaft and through the fastener flange to the first end of the fourth sleeve thereby forcing the third sleeve shaft to move closer to the fourth sleeve shaft.

17. The method of claim 11 wherein providing the first sleeve shaft further comprises providing a step in the first sleeve shaft that contacts at least one of the plurality of synchronizers.

18. The method of claim 11 further comprising providing a spacer concentric with the first shaft and the first sleeve shaft and disposed between a transmission housing structure and at least one of the plurality of synchronizers.

* * * * *